US012644554B2

(12) United States Patent
Tsuda et al.

(10) Patent No.: US 12,644,554 B2
(45) Date of Patent: Jun. 2, 2026

(54) INJECTION MOLDED ARTICLE, LINING TUBE AND LINING VALVE

(71) Applicant: DAIKIN INDUSTRIES, LTD., Osaka (JP)

(72) Inventors: Hayato Tsuda, Osaka (JP); Tadaharu Isaka, Osaka (JP); Yumi Zenke, Osaka (JP); Yukari Yamamoto, Osaka (JP); Yasuyuki Yamaguchi, Osaka (JP); Hiroyuki Hamada, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 406 days.

(21) Appl. No.: 18/452,806

(22) Filed: Aug. 21, 2023

(65) Prior Publication Data

US 2023/0390979 A1     Dec. 7, 2023

Related U.S. Application Data

(63) Continuation of application No. PCT/JP2022/007738, filed on Feb. 24, 2022.

(30) Foreign Application Priority Data

| | | |
|---|---|---|
| Feb. 26, 2021 | (JP) | ................................. 2021-031086 |
| Feb. 26, 2021 | (JP) | ................................. 2021-031087 |

(Continued)

(51) Int. Cl.
F16L 55/165 (2006.01)
B29C 45/00 (2006.01)
(Continued)

(52) U.S. Cl.
CPC ...... F16L 55/1656 (2013.01); B29C 45/0001 (2013.01); B29C 45/14622 (2013.01);
(Continued)

(58) Field of Classification Search
CPC . F16L 55/165; F16L 55/1656; F16L 58/1009; B29C 45/0001; B29C 45/14622; B29L 2023/22
See application file for complete search history.

(56) References Cited

U.S. PATENT DOCUMENTS

| | | | | |
|---|---|---|---|---|
| 2,349,549 A | * | 5/1944 | Hardman | ............ F16L 55/1654 |
| | | | | 264/516 |
| 3,635,926 A | | 1/1972 | Gresham et al. | |

(Continued)

FOREIGN PATENT DOCUMENTS

| | | |
|---|---|---|
| CN | 1599757 A | 3/2005 |
| CN | 103946250 A | 7/2014 |

(Continued)

OTHER PUBLICATIONS

Translation of the International Search Report issued Oct. 13, 2020 in International Application No. PCT/JP2020/032236.
(Continued)

*Primary Examiner* — Nicholas L Foster
(74) *Attorney, Agent, or Firm* — Sughrue Mion, PLLC

(57) ABSTRACT

Provided is an injection molded article including a pipe body section forming a flow path of a fluid, and a flange section formed on one end or both ends of the pipe body section, wherein the maximum thickness of the flange section is 2 to 12 mm, the injection molded article contains a copolymer containing tetrafluoroethylene unit and a fluoro(alkyl vinyl ether) unit, the content of the fluoro(alkyl vinyl ether) unit of the copolymer is 2.8 to 6.0% by mass with respect to the whole of the monomer units, the melt flow rate at 372° C. of the copolymer is 4.0 g/10 min or higher and lower than 11.0 g/10 min, and the number of functional groups of the copolymer is 50 or less.

8 Claims, 1 Drawing Sheet

(30) Foreign Application Priority Data

| | | | |
|---|---|---|---|
| Feb. 26, 2021 | (JP) | ................................ | 2021-031088 |
| Feb. 26, 2021 | (JP) | ................................ | 2021-031091 |
| Feb. 26, 2021 | (JP) | ................................ | 2021-031094 |
| Feb. 26, 2021 | (JP) | ................................ | 2021-031114 |

(51) Int. Cl.

| | |
|---|---|
| *B29C 45/14* | (2006.01) |
| *B29L 23/00* | (2006.01) |
| *F16L 58/10* | (2006.01) |

(52) U.S. Cl.

CPC ......... *F16L 55/165* (2013.01); *F16L 58/1009* (2013.01); *B29L 2023/22* (2013.01)

(56) References Cited

U.S. PATENT DOCUMENTS

| | | | |
|---|---|---|---|
| 3,945,786 A | 3/1976 | Bishop | |
| 4,029,868 A | 6/1977 | Carlson | |
| 4,262,101 A | 4/1981 | Hartwimmer et al. | |
| 4,414,356 A | 11/1983 | Michel | |
| 4,510,300 A | 4/1985 | Levy | |
| 4,743,658 A | 5/1988 | Imbalzano et al. | |
| 4,902,444 A | 2/1990 | Kolouch | |
| 5,000,875 A | 3/1991 | Kolouch | |
| 5,277,455 A * | 1/1994 | Graves ................. | F16L 58/1009 |
| | | | 285/55 |
| 5,656,392 A | 8/1997 | Sano et al. | |
| 5,767,198 A | 6/1998 | Shimizu et al. | |
| 5,851,693 A | 12/1998 | Sano et al. | |
| 6,066,707 A | 5/2000 | Colaianna et al. | |
| 6,069,215 A | 5/2000 | Araki et al. | |
| 6,096,795 A | 8/2000 | Abusleme et al. | |
| 6,689,833 B1 | 2/2004 | Bidstrup et al. | |
| 6,713,183 B2 | 3/2004 | Araki et al. | |
| 6,740,375 B1 | 5/2004 | Sagisaka et al. | |
| 6,774,196 B1 | 8/2004 | Taira et al. | |
| 6,840,545 B2 * | 1/2005 | Schulte-Ladbeck .......................... | |
| | | | B29C 65/562 |
| | | | 285/21.2 |
| 7,169,868 B2 * | 1/2007 | Aoyama .................... | C08F 8/22 |
| | | | 152/209.1 |
| 11,236,226 B2 * | 2/2022 | Nishimura .......... | B29C 45/0025 |
| 11,623,984 B2 * | 4/2023 | Nishimura .......... | B29C 45/0025 |
| | | | 525/200 |
| 11,826,975 B2 | 11/2023 | Imamura et al. | |
| 11,926,753 B2 * | 3/2024 | Imamura ............... | C08F 214/26 |
| 2002/0011692 A1 | 1/2002 | Lahijani | |
| 2002/0099143 A1 | 7/2002 | Namura | |
| 2002/0167115 A1 | 11/2002 | Tanaka | |
| 2003/0013791 A1 | 1/2003 | Blong et al. | |
| 2003/0075919 A1 * | 4/2003 | Schulte-Ladbeck .......................... | |
| | | | B29C 66/5221 |
| | | | 285/368 |
| 2003/0109646 A1 | 6/2003 | Kubo et al. | |
| 2003/0114615 A1 | 6/2003 | Sumi et al. | |
| 2003/0190530 A1 | 10/2003 | Yang et al. | |
| 2003/0216531 A1 | 11/2003 | Aten et al. | |
| 2004/0072935 A1 | 4/2004 | Blong et al. | |
| 2004/0102572 A1 | 5/2004 | Kubo et al. | |
| 2004/0204536 A1 | 10/2004 | Miyatani et al. | |
| 2004/0260044 A1 | 12/2004 | Earnest, Jr. et al. | |
| 2005/0020792 A1 | 1/2005 | Aoyama et al. | |
| 2005/0245626 A1 | 11/2005 | Hoaglund et al. | |
| 2007/0112155 A1 | 5/2007 | Takase et al. | |
| 2007/0149734 A1 | 6/2007 | Sakakibara et al. | |
| 2007/0281166 A1 | 12/2007 | Nishio | |
| 2007/0292685 A1 | 12/2007 | Brothers et al. | |
| 2008/0038627 A1 | 2/2008 | Yamauchi et al. | |
| 2008/0114143 A1 | 5/2008 | Brothers et al. | |
| 2008/0241534 A1 | 10/2008 | Ohtani et al. | |
| 2009/0038821 A1 | 2/2009 | Sato et al. | |
| 2009/0044965 A1 | 2/2009 | Kono et al. | |
| 2009/0176952 A1 | 7/2009 | Funaki et al. | |
| 2009/0246435 A1 | 10/2009 | Shimono et al. | |
| 2010/0063214 A1 | 3/2010 | Kasahara et al. | |
| 2010/0212929 A1 | 8/2010 | Ishii et al. | |
| 2010/0273047 A1 | 10/2010 | Kunoike et al. | |
| 2010/0314153 A1 | 12/2010 | Ishii et al. | |
| 2010/0314154 A1 | 12/2010 | Kitahara et al. | |
| 2011/0049878 A1 * | 3/2011 | Goode .................. | F16L 58/187 |
| | | | 285/405 |
| 2011/0052970 A1 | 3/2011 | Kurata et al. | |
| 2011/0052977 A1 | 3/2011 | Kurata et al. | |
| 2011/0104562 A1 | 5/2011 | Byun et al. | |
| 2011/0203830 A1 | 8/2011 | Kono et al. | |
| 2011/0272173 A1 | 11/2011 | Shiotsuki et al. | |
| 2012/0035329 A1 | 2/2012 | Isogai et al. | |
| 2012/0064273 A1 | 3/2012 | Bacino | |
| 2012/0094169 A1 | 4/2012 | Kim et al. | |
| 2013/0046058 A1 | 2/2013 | Pham et al. | |
| 2013/0130100 A1 | 5/2013 | Kurata et al. | |
| 2013/0230645 A1 * | 9/2013 | Kitahara .............. | C09D 127/18 |
| | | | 427/117 |
| 2014/0227533 A1 | 8/2014 | Murakami et al. | |
| 2014/0287177 A1 | 9/2014 | Suda et al. | |
| 2014/0378616 A1 | 12/2014 | Nakano et al. | |
| 2015/0041145 A1 | 2/2015 | Colaianna et al. | |
| 2015/0148481 A1 | 5/2015 | Brothers et al. | |
| 2015/0158988 A1 | 6/2015 | Sawaki et al. | |
| 2015/0353700 A1 | 12/2015 | Isaka et al. | |
| 2016/0006004 A1 | 1/2016 | Ogawa et al. | |
| 2016/0078979 A1 | 3/2016 | Hosoda et al. | |
| 2016/0108159 A1 | 4/2016 | Sekiguchi et al. | |
| 2016/0194491 A1 | 7/2016 | Taguchi et al. | |
| 2016/0272805 A1 | 9/2016 | Nakanishi et al. | |
| 2016/0319089 A1 | 11/2016 | Imamura et al. | |
| 2016/0322128 A1 | 11/2016 | Imamura et al. | |
| 2016/0340455 A1 | 11/2016 | Abe et al. | |
| 2017/0008986 A1 | 1/2017 | Isaka et al. | |
| 2017/0025204 A1 | 1/2017 | Chapman et al. | |
| 2017/0154707 A1 | 6/2017 | Abe et al. | |
| 2017/0214037 A1 | 7/2017 | Uematsu et al. | |
| 2017/0260344 A1 | 9/2017 | Imamura et al. | |
| 2018/0009204 A1 | 1/2018 | Higuchi et al. | |
| 2018/0036931 A1 | 2/2018 | Higuchi et al. | |
| 2018/0237566 A1 | 8/2018 | Aida et al. | |
| 2018/0265654 A1 | 9/2018 | Imamura et al. | |
| 2018/0283590 A1 | 10/2018 | Yokoyama et al. | |
| 2019/0134939 A1 | 5/2019 | Colaianna et al. | |
| 2019/0143628 A1 | 5/2019 | Colaianna et al. | |
| 2019/0177453 A1 | 6/2019 | Isaka et al. | |
| 2019/0193315 A1 | 6/2019 | Miyamoto et al. | |
| 2019/0375929 A1 | 12/2019 | Nishimura et al. | |
| 2019/0382544 A1 | 12/2019 | Yokotani et al. | |
| 2020/0332037 A1 | 10/2020 | Isaka et al. | |
| 2021/0008827 A1 | 1/2021 | Colaianna et al. | |
| 2021/0008828 A1 | 1/2021 | Colaianna et al. | |
| 2021/0024709 A1 | 1/2021 | Fukushima et al. | |
| 2021/0024769 A1 | 1/2021 | Imamura et al. | |
| 2021/0189031 A1 | 6/2021 | Hintzer et al. | |
| 2021/0269568 A1 | 9/2021 | Imamura et al. | |
| 2022/0001657 A1 | 1/2022 | Kikuchi et al. | |
| 2022/0033636 A1 | 2/2022 | Nishimura et al. | |
| 2022/0170573 A1 | 6/2022 | Imamura et al. | |
| 2022/0181689 A1 | 6/2022 | Isaka et al. | |
| 2022/0181698 A1 | 6/2022 | Isaka et al. | |
| 2022/0181729 A1 | 6/2022 | Isaka et al. | |
| 2022/0195088 A1 | 6/2022 | Imamura et al. | |
| 2022/0213996 A1 | 7/2022 | Imamura et al. | |
| 2022/0266485 A1 | 8/2022 | Tsuda et al. | |
| 2022/0278403 A1 | 9/2022 | Isaka et al. | |
| 2022/0281144 A1 * | 9/2022 | Imamura ............. | C08F 214/267 |
| 2023/0227594 A1 | 7/2023 | Yamamoto et al. | |
| 2023/0235107 A1 | 7/2023 | Isaka et al. | |
| 2023/0235159 A1 | 7/2023 | Isaka et al. | |
| 2023/0235160 A1 | 7/2023 | Isaka et al. | |
| 2023/0238627 A1 | 7/2023 | Isaka et al. | |
| 2023/0238628 A1 | 7/2023 | Zenke et al. | |
| 2023/0238629 A1 | 7/2023 | Isaka et al. | |
| 2023/0272136 A1 | 8/2023 | Zenke et al. | |
| 2023/0295356 A1 | 9/2023 | Isaka et al. | |
| 2023/0344077 A1 | 10/2023 | Qiu et al. | |

(56) References Cited

U.S. PATENT DOCUMENTS

| | | | |
|---|---|---|---|
| 2023/0383031 A1 | 11/2023 | Isaka et al. | |
| 2023/0383032 A1 | 11/2023 | Isaka et al. | |
| 2023/0383033 A1 | 11/2023 | Zenke et al. | |
| 2023/0383034 A1 | 11/2023 | Isaka et al. | |
| 2023/0390977 A1 | 12/2023 | Hamada et al. | |
| 2023/0390978 A1 | 12/2023 | Tsuda et al. | |
| 2023/0390979 A1 | 12/2023 | Tsuda et al. | |
| 2023/0390980 A1 | 12/2023 | Tsuda et al. | |
| 2023/0390981 A1 | 12/2023 | Tsuda et al. | |
| 2023/0391909 A1 | 12/2023 | Isaka et al. | |
| 2023/0391910 A1 | 12/2023 | Isaka et al. | |
| 2023/0391911 A1 | 12/2023 | Isaka et al. | |
| 2023/0391912 A1 | 12/2023 | Isaka et al. | |
| 2023/0391914 A1* | 12/2023 | Isaka | C08J 3/20 |
| 2023/0391917 A1 | 12/2023 | Isaka et al. | |
| 2023/0391920 A1 | 12/2023 | Isaka et al. | |
| 2023/0391924 A1* | 12/2023 | Yamamoto | H01B 3/445 |
| 2023/0391925 A1* | 12/2023 | Isaka | H01B 7/02 |
| 2023/0391927 A1 | 12/2023 | Isaka | |
| 2023/0391928 A1* | 12/2023 | Isaka | C09D 127/18 |
| 2023/0391929 A1 | 12/2023 | Isaka et al. | |
| 2023/0391931 A1 | 12/2023 | Isaka et al. | |
| 2023/0391932 A1 | 12/2023 | Isaka et al. | |
| 2023/0391933 A1 | 12/2023 | Isaka et al. | |
| 2023/0392737 A1 | 12/2023 | Tsuda et al. | |
| 2023/0395282 A1 | 12/2023 | Isaka et al. | |
| 2023/0399428 A1* | 12/2023 | Isaka | C08J 5/18 |
| 2023/0399429 A1* | 12/2023 | Isaka | C08F 214/262 |
| 2023/0399431 A1 | 12/2023 | Isaka et al. | |
| 2023/0399432 A1 | 12/2023 | Isaka et al. | |
| 2023/0399433 A1* | 12/2023 | Isaka | C08F 214/262 |
| 2023/0399434 A1* | 12/2023 | Isaka | C08F 8/22 |
| 2023/0399436 A1* | 12/2023 | Isaka | C08F 214/262 |
| 2023/0399438 A1 | 12/2023 | Isaka et al. | |
| 2023/0399439 A1* | 12/2023 | Isaka | C09D 127/18 |
| 2023/0399441 A1 | 12/2023 | Isaka et al. | |
| 2023/0399443 A1 | 12/2023 | Isaka et al. | |
| 2023/0406975 A1 | 12/2023 | Isaka et al. | |
| 2023/0406976 A1 | 12/2023 | Isaka et al. | |
| 2023/0406977 A1* | 12/2023 | Isaka | C08F 214/262 |
| 2023/0411751 A1 | 12/2023 | Tsuda et al. | |
| 2023/0415387 A1 | 12/2023 | Hamada et al. | |
| 2025/0002728 A1 | 1/2025 | Zenke et al. | |
| 2025/0011488 A1 | 1/2025 | Isaka et al. | |
| 2025/0011490 A1 | 1/2025 | Isaka et al. | |
| 2025/0011494 A1 | 1/2025 | Isaka et al. | |
| 2025/0011496 A1 | 1/2025 | Yamamoto et al. | |
| 2025/0011498 A1 | 1/2025 | Isaka et al. | |
| 2025/0011499 A1 | 1/2025 | Isaka et al. | |
| 2025/0011500 A1 | 1/2025 | Isaka et al. | |
| 2025/0019476 A1 | 1/2025 | Isaka et al. | |
| 2025/0034302 A1 | 1/2025 | Isaka et al. | |

FOREIGN PATENT DOCUMENTS

| | | | |
|---|---|---|---|
| CN | 107428144 A | 12/2017 | |
| CN | 109476061 A | 3/2019 | |
| CN | 110712348 A | 1/2020 | |
| CN | 110790854 A | 2/2020 | |
| CN | 114223086 A | 3/2022 | |
| CN | 114258609 A | 3/2022 | |
| CN | 116390957 A | 7/2023 | |
| CN | 116867821 A | 10/2023 | |
| CN | 116917346 A | 10/2023 | |
| EP | 0 220 910 A2 | 5/1987 | |
| EP | 0 423 995 A1 | 4/1991 | |
| EP | 0 976 544 A1 | 2/2000 | |
| EP | 1 260 526 A1 | 11/2002 | |
| EP | 1 462 458 A1 | 9/2004 | |
| EP | 3 816 214 A1 | 5/2021 | |
| EP | 4 024 550 A1 | 7/2022 | |
| EP | 4 024 575 A1 | 7/2022 | |
| EP | 4 223 793 A1 | 8/2023 | |
| EP | 4 223 794 A1 | 8/2023 | |
| GB | 1210794 A | 10/1970 | |
| JP | 48-20788 B1 | 6/1973 | |
| JP | 58-132512 A | 8/1983 | |
| JP | 58-191127 A | 11/1983 | |
| JP | 59-120433 A | 7/1984 | |
| JP | 62-104822 A | 5/1987 | |
| JP | 62-53019 B2 | 11/1987 | |
| JP | 1-53167 B2 | 11/1989 | |
| JP | 2-129253 A | 5/1990 | |
| JP | 3-184209 A | 8/1991 | |
| JP | 3-247609 A | 11/1991 | |
| JP | 4-357398 A | 12/1992 | |
| JP | 6-1902 A | 1/1994 | |
| JP | 6-40813 B2 | 6/1994 | |
| JP | 6-287405 A | 10/1994 | |
| JP | 7-16869 A | 1/1995 | |
| JP | 7-112449 A | 5/1995 | |
| JP | 7-188337 A | 7/1995 | |
| JP | 7-290496 A | 11/1995 | |
| JP | 8-207106 A | 8/1996 | |
| JP | 8-321287 A | 12/1996 | |
| JP | 9-245832 A | 9/1997 | |
| JP | 10-87746 A | 4/1998 | |
| JP | 10-158456 A | 6/1998 | |
| JP | 10-275604 A | 10/1998 | |
| JP | 10-292054 A | 11/1998 | |
| JP | 2001-151825 A | 6/2001 | |
| JP | 2001-151826 A | 6/2001 | |
| JP | 2001-283907 A | 10/2001 | |
| JP | 2001-283921 A | 10/2001 | |
| JP | 2002-53620 A | 2/2002 | |
| JP | 2002-63934 A | 2/2002 | |
| JP | 2002-167488 A | 6/2002 | |
| JP | 2003-327770 A | 11/2003 | |
| JP | 2003-534940 A | 11/2003 | |
| JP | 2004-256406 A | 9/2004 | |
| JP | 2004-534131 A | 11/2004 | |
| JP | 2005-523979 A | 8/2005 | |
| JP | 2005-298659 A | 10/2005 | |
| JP | 2005-320497 A | 11/2005 | |
| JP | 2006-117912 A | 5/2006 | |
| JP | 2006-312736 A | 11/2006 | |
| JP | 2007-238960 A | 9/2007 | |
| JP | 2008-66254 A | 3/2008 | |
| JP | 2009-42478 A | 2/2009 | |
| JP | 2009-59690 A | 3/2009 | |
| JP | 2009-235564 A | 10/2009 | |
| JP | 2009-272207 A | 11/2009 | |
| JP | 2010-56079 A | 3/2010 | |
| JP | 2010-509443 A | 3/2010 | |
| JP | 2010-85741 A | 4/2010 | |
| JP | 2010-162817 A | 7/2010 | |
| JP | 2010-235667 A | 10/2010 | |
| JP | 2011-48976 A | 3/2011 | |
| JP | 2011-71104 A | 4/2011 | |
| JP | 2012-54269 A | 3/2012 | |
| JP | 2012-80911 A | 4/2012 | |
| JP | 2012-106494 A | 6/2012 | |
| JP | 2012-130557 A | 7/2012 | |
| JP | 2013-71341 A | 4/2013 | |
| JP | 2013-82888 A | 5/2013 | |
| JP | 2013-177574 A | 9/2013 | |
| JP | 2014-28951 A | 2/2014 | |
| JP | 2014-59052 A | 4/2014 | |
| JP | 2014-187040 A | 10/2014 | |
| JP | 2015-7218 A | 1/2015 | |
| JP | 2015-519410 A | 7/2015 | |
| JP | 2015-147924 A | 8/2015 | |
| JP | 2015-168840 A | 9/2015 | |
| JP | 2016-537499 A | 12/2016 | |
| JP | 2017-197690 A | 11/2017 | |
| JP | 2018-20468 A | 2/2018 | |
| JP | 2018-514598 A | 6/2018 | |
| JP | 2018-523272 A | 8/2018 | |
| JP | 2018-159090 A | 10/2018 | |
| JP | 2019-172962 A | 10/2019 | |
| JP | 2019-210420 A | 12/2019 | |
| JP | 2019-214641 A | 12/2019 | |
| JP | 2020-2341 A | 1/2020 | |
| JP | 2020-15906 A | 1/2020 | |

(56)  References Cited

FOREIGN PATENT DOCUMENTS

| JP | 2020-29042 A | 2/2020 |
|---|---|---|
| JP | 2020-100823 A | 7/2020 |
| JP | 2020-100843 A | 7/2020 |
| JP | 2021-6648 A | 1/2021 |
| JP | 2021-141043 A | 9/2021 |
| JP | 2021-141045 A | 9/2021 |
| JP | 2022-19196 A | 1/2022 |
| KR | 10-2004-0071160 A | 8/2004 |
| KR | 10-2013-0069652 A1 | 6/2013 |
| KR | 10-2019-0034205 A | 4/2019 |
| WO | 95/29956 A1 | 11/1995 |
| WO | 01/40331 A1 | 6/2001 |
| WO | 03/006566 A1 | 1/2003 |
| WO | 03/048214 A1 | 6/2003 |
| WO | 2004/052987 A1 | 6/2004 |
| WO | 2008/032613 A1 | 3/2008 |
| WO | 2008/047759 A1 | 4/2008 |
| WO | 2008/047906 A1 | 4/2008 |
| WO | 2008/143069 A1 | 11/2008 |
| WO | 2010/113864 A1 | 10/2010 |
| WO | 2013/115374 A1 | 8/2013 |
| WO | 2014/007346 A1 | 1/2014 |
| WO | 2014/129413 A1 | 8/2014 |
| WO | 2015/119053 A1 | 8/2015 |
| WO | 2016/117492 A1 | 7/2016 |
| WO | 2017/056203 A1 | 4/2017 |
| WO | 2017/082417 A1 | 5/2017 |
| WO | 2019/003265 A1 | 1/2019 |
| WO | 2019/187725 A1 | 10/2019 |
| WO | 2019/189316 A1 | 10/2019 |
| WO | 2020/004083 A1 | 1/2020 |
| WO | 2020/090981 A1 | 5/2020 |
| WO | 2020/204163 A1 | 10/2020 |
| WO | 2021/033539 A1 | 2/2021 |
| WO | 2021/039862 A1 | 3/2021 |
| WO | 2021/039863 A1 | 3/2021 |
| WO | 2021/039865 A1 | 3/2021 |
| WO | 2021039864 A1 | 3/2021 |
| WO | 2021/059753 A1 | 4/2021 |
| WO | 2022/181225 A1 | 1/2022 |
| WO | 2022/181231 A1 | 9/2022 |
| WO | 2022/181232 A1 | 9/2022 |

OTHER PUBLICATIONS

Translation of the International Search Report issued Oct. 13, 2020 in International Application No. PCT/JP2020/032237.

Translation of the International Search Report issued Oct. 13, 2020 in International Application No. PCT/JP2020/032238.

Translation of the International Search Report issued Oct. 13, 2020 in International Application No. PCT/JP2020/032239.

Translation of the International Search Report issued Oct. 6, 2020 in International Application No. PCT/JP2020/032234.

International Preliminary Report on Patentability, with Translation of Written Opinion issued Mar. 1, 2022 in International Application No. PCT/JP2020/032238.

International Preliminary Report on Patentability, with Translation of Written Opinion issued Mar. 1, 2022 in International Application No. PCT/JP2020/032239.

International Preliminary Report on Patentability, with Translation of Written Opinion issued Mar. 1, 2022 in International Application No. PCT/JP2020/032236.

International Preliminary Report on Patentability, with Translation of Written Opinion issued Mar. 1, 2022 in International Application No. PCT/JP2020/032237.

International Preliminary Report on Patentability, with Translation of Written Opinion issued Mar. 1, 2022 in International Application No. PCT/JP2020/032234.

Translation of the International Search Report dated Dec. 21, 2021 in International Application No. PCT/JP2021/036301.

Translation of the International Search Report dated Dec. 21, 2021 in International Application No. PCT/JP2021/036302.

Translation of the International Search Report dated Dec. 21, 2021 in International Application No. PCT/JP2021/036303.

Translation of the International Search Report dated Nov. 9, 2021 in International Application No. PCT/JP2021/036304.

Translation of the International Search Report dated Apr. 12, 2022 in International Application No. PCT/JP2022/003643.

Translation of the International Search Report dated Nov. 1, 2021 in International Application No. PCT/JP2021/036305.

Translation of the International Search Report dated Nov. 22, 2021 in International Application No. PCT/JP2021/036306.

Translation of the International Search Report dated Nov. 22, 2021 in International Application No. PCT/JP2021/036307.

Translation of the International Search Report dated Nov. 22, 2021 in International Application No. PCT/JP2021/036308.

Translation of the International Search Report dated Nov. 22, 2021 in International Application No. PCT/JP2021/036309.

Translation of the International Search Report dated Nov. 22, 2021 in International Application No. PCT/JP2021/036310.

Translation of the International Search Report dated Apr. 19, 2022 in International Application No. PCT/JP2022/003634.

Translation of the International Search Report dated Apr. 19, 2022 in International Application No. PCT/JP2022/003636.

Translation of the International Search Report dated Apr. 5, 2022 in International Application No. PCT/JP2022/003637.

Translation of the International Search Report dated Apr. 5, 2022 in International Application No. PCT/JP2022/003638.

Translation of the International Search Report dated Apr. 5, 2022 in International Application No. PCT/JP2022/003640.

Translation of the International Search Report dated Apr. 5, 2022 in International Application No. PCT/JP2022/003641.

Translation of the International Search Report dated Apr. 12, 2022 in International Application No. PCT/JP2022/003642.

Translation of the International Search Report dated Apr. 19, 2022 in International Application No. PCT/JP2022/003644.

Translation of the International Search Report dated Apr. 19, 2022 in International Application No. PCT/JP2022/003645.

Translation of the International Search Report dated Apr. 12, 2022 in International Application No. PCT/JP2022/003646.

Translation of the International Search Report dated Apr. 12, 2022 in International Application No. PCT/JP2022/003647.

Translation of the International Search Report dated Mar. 8, 2022 in International Application No. PCT/JP2022/003648.

Translation of the International Search Report dated Apr. 19, 2022 in International Application No. PCT/JP2022/003649.

Translation of the International Search Report dated Apr. 19, 2022 in International Application No. PCT/JP2022/003650.

Translation of the International Search Report dated Apr. 19, 2022 in International Application No. PCT/JP2022/003651.

Translation of the International Search Report dated Mar. 22, 2022 in International Application No. PCT/JP2022/003652.

Translation of the International Search Report dated Apr. 19, 2022 in International Application No. PCT/JP2022/003653.

Translation of the International Search Report dated Apr. 19, 2022 in International Application No. PCT/JP2022/003654.

Translation of the International Search Report dated Mar. 22, 2022 in International Application No. PCT/JP2022/003657.

Translation of the International Search Report dated Mar. 22, 2022 in International Application No. PCT/JP2022/003658.

Translation of the International Search Report dated Apr. 19, 2022 in International Application No. PCT/JP2022/003659.

Translation of the International Search Report dated Mar. 8, 2022 in International Application No. PCT/JP2022/003660.

Translation of the International Search Report dated Mar. 15, 2022 in International Application No. PCT/JP2022/003661.

Translation of the International Search Report dated Apr. 19, 2022 in International Application No. PCT/JP2022/003664.

Translation of the International Search Report dated Apr. 19, 2022 in International Application No. PCT/JP2022/003665.

Translation of the International Search Report dated May 24, 2022 in International Application No. PCT/JP2022/007735.

Translation of the International Search Report dated May 17, 2022 in International Application No. PCT/JP2022/007737.

(56) References Cited

OTHER PUBLICATIONS

Translation of the International Search Report dated May 10, 2022 in International Application No. PCT/JP2022/007738.

Translation of the International Search Report dated Apr. 19, 2022 in International Application No. PCT/JP2022/003635.

International Preliminary Report on Patentability, with Translation of Written Opinion issued Mar. 28, 2023 in International Application No. PCT/JP2021/036301.

International Preliminary Report on Patentability, with Translation of Written Opinion issued Mar. 28, 2023 in International Application No. PCT/JP2021/036302.

International Preliminary Report on Patentability, with Translation of Written Opinion issued Mar. 28, 2023 in International Application No. PCT/JP2021/036303.

International Preliminary Report on Patentability, with Translation of Written Opinion issued Mar. 28, 2023 in International Application No. PCT/JP2021/036304.

International Preliminary Report on Patentability, with Translation of Written Opinion issued Mar. 28, 2023 in International Application No. PCT/JP2021/036305.

International Preliminary Report on Patentability, with Translation of Written Opinion issued Mar. 28, 2023 in International Application No. PCT/JP2021/036306.

International Preliminary Report on Patentability, with Translation of Written Opinion issued Mar. 28, 2023 in International Application No. PCT/JP2021/036307.

International Preliminary Report on Patentability, with Translation of Written Opinion issued Mar. 28, 2023 in International Application No. PCT/JP2021/036308.

International Preliminary Report on Patentability, with Translation of Written Opinion issued Mar. 28, 2023 in International Application No. PCT/JP2021/036309.

International Preliminary Report on Patentability, with Translation of Written Opinion issued Mar. 28, 2023 in International Application No. PCT/JP2021/036310.

European Search Report issued Aug. 2, 2023 for European Patent Application No. 20 857 704.9.

International Preliminary Report on Patentability, with Translation of Written Opinion issued Aug. 29, 2023 in International Application No. PCT/JP2022/003634.

International Preliminary Report on Patentability, with Translation of Written Opinion issued Aug. 29, 2023 in International Application No. PCT/JP2022/003635.

International Preliminary Report on Patentability, with Translation of Written Opinion issued Aug. 29, 2023 in International Application No. PCT/JP2022/003636.

International Preliminary Report on Patentability, with Translation of Written Opinion issued Aug. 29, 2023 in International Application No. PCT/JP2022/003637.

International Preliminary Report on Patentability, with Translation of Written Opinion issued Aug. 29, 2023 in International Application No. PCT/JP2022/003638.

International Preliminary Report on Patentability, with Translation of Written Opinion issued Aug. 29, 2023 in International Application No. PCT/JP2022/003640.

International Preliminary Report on Patentability, with Translation of Written Opinion issued Aug. 29, 2023 in International Application No. PCT/JP2022/003641.

International Preliminary Report on Patentability, with Translation of Written Opinion issued Aug. 29, 2023 in International Application No. PCT/JP2022/003642.

International Preliminary Report on Patentability, with Translation of Written Opinion issued Aug. 29, 2023 in International Application No. PCT/JP2022/003643.

International Preliminary Report on Patentability, with Translation of Written Opinion issued Aug. 29, 2023 in International Application No. PCT/JP2022/003644.

International Preliminary Report on Patentability, with Translation of Written Opinion issued Aug. 29, 2023 in International Application No. PCT/JP2022/003645.

International Preliminary Report on Patentability, with Translation of Written Opinion issued Aug. 29, 2023 in International Application No. PCT/JP2022/003646.

International Preliminary Report on Patentability, with Translation of Written Opinion issued Aug. 29, 2023 in International Application No. PCT/JP2022/003647.

International Preliminary Report on Patentability, with Translation of Written Opinion issued Aug. 29, 2023 in International Application No. PCT/JP2022/003648.

International Preliminary Report on Patentability, with Translation of Written Opinion issued Aug. 29, 2023 in International Application No. PCT/JP2022/003649.

International Preliminary Report on Patentability, with Translation of Written Opinion issued Aug. 29, 2023 in International Application No. PCT/JP2022/003650.

International Preliminary Report on Patentability, with Translation of Written Opinion issued Aug. 29, 2023 in International Application No. PCT/JP2022/003651.

International Preliminary Report on Patentability, with Translation of Written Opinion issued Aug. 29, 2023 in International Application No. PCT/JP2022/003652.

International Preliminary Report on Patentability, with Translation of Written Opinion issued Aug. 29, 2023 in International Application No. PCT/JP2022/003653.

International Preliminary Report on Patentability, with Translation of Written Opinion issued Aug. 29, 2023 in International Application No. PCT/JP2022/003654.

International Preliminary Report on Patentability, with Translation of Written Opinion issued Aug. 29, 2023 in International Application No. PCT/JP2022/003657.

International Preliminary Report on Patentability, with Translation of Written Opinion issued Aug. 29, 2023 in International Application No. PCT/JP2022/003658.

International Preliminary Report on Patentability, with Translation of Written Opinion issued Aug. 29, 2023 in International Application No. PCT/JP2022/003659.

International Preliminary Report on Patentability, with Translation of Written Opinion issued Aug. 29, 2023 in International Application No. PCT/JP2022/003660.

International Preliminary Report on Patentability, with Translation of Written Opinion issued Aug. 29, 2023 in International Application No. PCT/JP2022/003661.

International Preliminary Report on Patentability, with Translation of Written Opinion issued Aug. 29, 2023 in International Application No. PCT/JP2022/003664.

International Preliminary Report on Patentability, with Translation of Written Opinion issued Aug. 29, 2023 in International Application No. PCT/JP2022/003665.

International Preliminary Report on Patentability, with Translation of Written Opinion issued Aug. 29, 2023 in International Application No. PCT/JP2022/007735.

International Preliminary Report on Patentability, with Translation of Written Opinion issued Aug. 29, 2023 in International Application No. PCT/JP2022/007737.

International Preliminary Report on Patentability, with Translation of Written Opinion issued Aug. 29, 2023 in International Application No. PCT/JP2022/007738.

Translation of the International Search Report dated Jun. 20, 2023 in International Application No. PCT/JP2023/013284.

Translation of the International Search Report dated Jun. 6, 2023 in International Application No. PCT/JP2023/013285.

Translation of the International Search Report dated Jun. 6, 2023 in International Application No. PCT/JP2023/013289.

Translation of the International Search Report dated Jun. 6, 2023 in International Application No. PCT/JP2023/013291.

Translation of the International Search Report dated Jun. 6, 2023 in International Application No. PCT/JP2023/013292.

Translation of the International Search Report dated Jun. 6, 2023 in International Application No. PCT/JP2023/013293.

Translation of the International Search Report dated Jun. 6, 2023 in International Application No. PCT/JP2023/013331.

Translation of the International Search Report dated Jun. 6, 2023 in International Application No. PCT/JP2023/013332.

(56) References Cited

OTHER PUBLICATIONS

Translation of the International Search Report dated Jun. 6, 2023 in International Application No. PCT/JP2023/013333.

Translation of the International Search Report dated Jun. 20, 2023 in International Application No. PCT/JP2023/013290.

European Search Report issued Oct. 20, 2023 for European Patent Application No. 20 856 953.3.

European Search Report issued Oct. 20, 2023 for European Patent Application No. 20 857 574.6.

European Search Report issued Oct. 20, 2023 for European Patent Application No. 20 857 843.5.

European Search Report issued Oct. 20, 2023 for European Patent Application No. 20 857 470.7.

International Search Report dated Jun. 20, 2023 in International Application No. PCT/JP2023/013284.

International Search Report dated Jun. 6, 2023 in International Application No. PCT/JP2023/013285.

International Search Report dated Jun. 6, 2023 for International Application No. PCT/JP2023/013289.

International Search Report dated Jun. 20, 2023 for International Application No. PCT/JP2023/013290.

International Search Report dated Jun. 6, 2023 for International Application No. PCT/JP2023/013291.

International Search Report dated Jun. 6, 2023 for International Application No. PCT/JP2023/013292.

International Search Report dated Jun. 6, 2023 for International Application No. PCT/JP2023/013293.

International Search Report dated Jun. 6, 2023 for International Application No. PCT/JP2023/013331.

International Search Report dated Jun. 6, 2023 for International Application No. PCT/JP2023/013332.

International Search Report dated Jun. 6, 2023 for International Application No. PCT/JP2023/013333.

International Preliminary Report on Patentability, with Translation of Written Opinion issued Sep. 24, 2024 in International Application No. PCT/JP2023/013284.

International Preliminary Report on Patentability, with Translation of Written Opinion issued Sep. 24, 2024 in International Application No. PCT/JP2023/013285.

International Preliminary Report on Patentability, with Translation of Written Opinion issued Sep. 24, 2024 in International Application No. PCT/JP2023/013289.

International Preliminary Report on Patentability, with Translation of Written Opinion issued Sep. 24, 2024 in International Application No. PCT/JP2023/013290.

International Preliminary Report on Patentability, with Translation of Written Opinion issued Sep. 24, 2024 in International Application No. PCT/JP2023/013291.

International Preliminary Report on Patentability, with Translation of Written Opinion issued Sep. 24, 2024 in International Application No. PCT/JP2023/013292.

International Preliminary Report on Patentability, with Translation of Written Opinion issued Sep. 24, 2024 in International Application No. PCT/JP2023/013293.

International Preliminary Report on Patentability, with Translation of Written Opinion issued Sep. 24, 2024 in International Application No. PCT/JP2023/013331.

International Preliminary Report on Patentability, with Translation of Written Opinion issued Sep. 24, 2024 in International Application No. PCT/JP2023/013332.

International Preliminary Report on Patentability, with Translation of Written Opinion issued Sep. 24, 2024 in International Application No. PCT/JP2023/013333.

European Search Report issued Aug. 27, 2024 for European Patent Application No. 21875831.6.

European Search Report issued Aug. 27, 2024 for European Patent Application No. 21875832.4.

European Search Report issued Aug. 29, 2024 for European Patent Application No. 21875833.2.

European Search Report issued Aug. 29, 2024 for European Patent Application No. 21875834.0.

European Search Report issued Sep. 9, 2024 for European Patent Application No. 21875826.6.

European Search Report issued Sep. 9, 2024 for European Patent Application No. 21875828.2.

European Search Report issued Sep. 9, 2024 for European Patent Application No. 21875829.0.

European Search Report issued Sep. 9, 2024 for European Patent Application No. 21875830.8.

European Search Report issued Sep. 10, 2024 for European Patent Application No. 21875835.7.

European Search Report issued Sep. 19, 2024 for European Patent Application No. 21875827.4.

European Search Report issued Dec. 4, 2024 for European Patent Application No. 22759287.0.

European Search Report issued Dec. 5, 2024 for European Patent Application No. 22759265.6.

European Search Report issued Dec. 10, 2024 for European Patent Application No. 22759267.2.

European Search Report issued Dec. 13, 2024 for European Patent Application No. 22 759 272.2.

European Search Report issued Dec. 16, 2024 for European Patent Application No. 22759276.3.

European Search Report issued Dec. 13, 2024 for European Patent Application No. 22759273.0.

European Search Report issued Dec. 19, 2024 for European Patent Application No. 22759264.9.

European Search Report issued Dec. 19, 2024 for European Patent Application No. 22759277.1.

European Search Report issued Jan. 2, 2025 for European Patent Application No. 22759281.3.

European Search Report issued Jan. 3, 2025 for European Patent Application No. 22759261.5.

European Search Report issued Jan. 3, 2025 for European Patent Application No. 22759274.8.

European Search Report issued Jan. 16, 2025 for European Patent Application No. 22759269.8.

European Search Report issued Jan. 14, 2025 for European Patent Application No. 22759282.1.

European Search Report issued Jan. 14, 2025 for European Patent Application No. 22759262.3.

European Search Report issued Jan. 16, 2025 for European Patent Application No. 22759284.7.

European Search Report issued Jan. 27, 2025 for European Patent Application No. 22759268.0.

European Search Report issued Jan. 27, 2025 for European Patent Application No. 22759285.4.

European Search Report issued Feb. 4, 2025 for European Patent Application No. 22759266.4.

Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).

Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).

Nanyang Zhao et al., "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).

European Search Report issued Feb. 10, 2025 for European Patent Application No. 22759283.9.

European Search Report issued Feb. 20, 2025 for European Patent Application No. 22759263.1.

Extended European Search Report dated Mar. 11, 2026 in application No. 23 780 928.0.

Extended European Search Report dated Mar. 11, 2026 in application No. 23 780 929.8.

Extended European Search Report dated Mar. 11, 2026 in application No. 23 780 936.3.

(56) References Cited

OTHER PUBLICATIONS

Extended European Search Report dated Mar. 11, 2026 in application No. 23 780 953.8.
Extended European Search Report dated Mar. 11, 2026 in application No. 23 780 954.6.
Extended European Search Report dated Mar. 11, 2026 in application No. 23 780 955.3.
Extended European Search Report dated Mar. 11, 2026 in application No. 23 780 932.2.
Extended European Search Report dated Mar. 11, 2026 in application No. 23 780 933.0.
Extended European Search Report dated Mar. 11, 2026 in application No. 23 780 934.8.

* cited by examiner

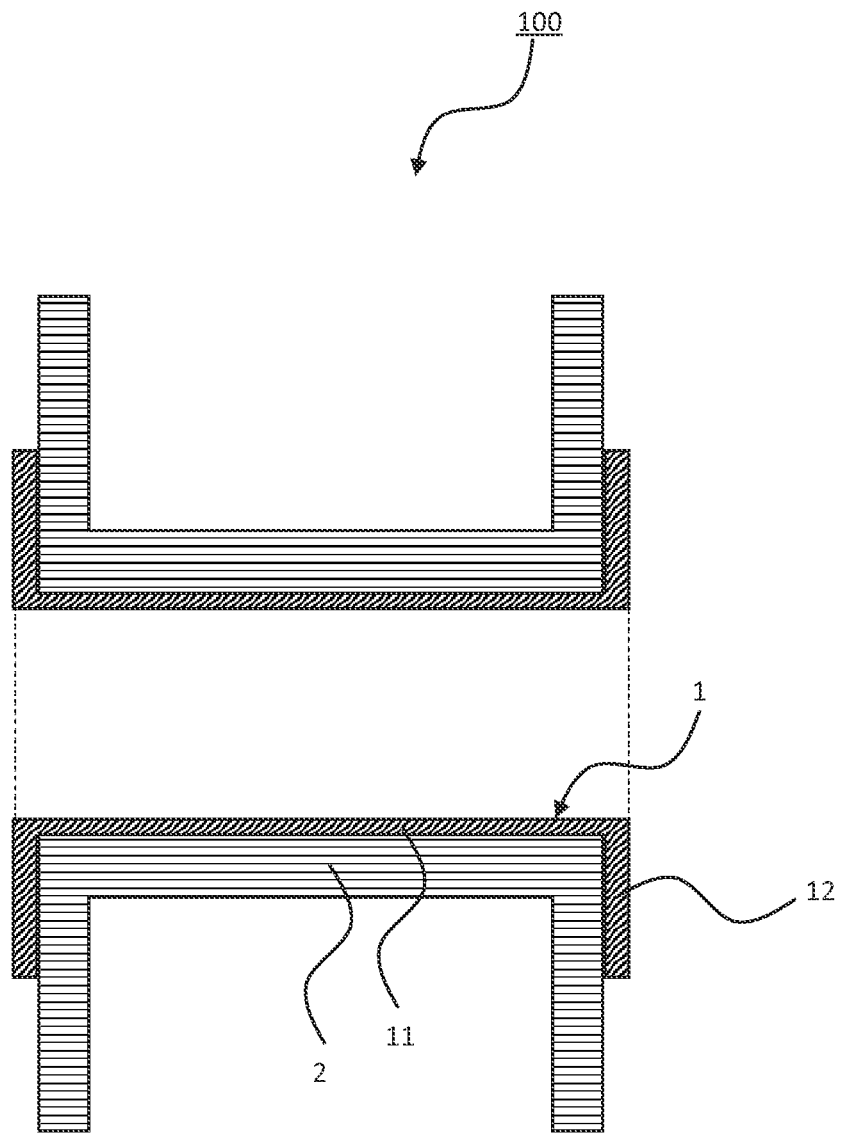

INJECTION MOLDED ARTICLE, LINING TUBE AND LINING VALVE

CROSS-REFERENCE TO RELATED APPLICATIONS

This application is a Rule 53(b) Continuation of International Application No. PCT/JP2022/007738 filed Feb. 24, 2022, which claims priorities based on Japanese Patent Application No. 2021-031086 filed Feb. 26, 2021, Japanese Patent Application No. 2021-031087 filed Feb. 26, 2021, Japanese Patent Application No. 2021-031088 filed Feb. 26, 2021, Japanese Patent Application No. 2021-031094 filed Feb. 26, 2021, Japanese Patent Application No. 2021-031091 filed Feb. 26, 2021, and Japanese Patent Application No. 2021-031114 filed Feb. 26, 2021, the respective disclosures of which are incorporated herein by reference in their entirety.

TECHNICAL FIELD

The present disclosure relates to an injection molded article, a lining pipe and a lining valve.

BACKGROUND ART

Patent Document 1 describes a lining pipe in which lining is applied to the inner circumferential surface and the flange surface of a conduit.

Patent Document 2 describes a method for lining an inner surface of a cylindrical article by inserting a cylindrical core into the hollow of the cylindrical article, injecting a resin into a space between the article and the core, and extracting the core after the resin is cooled and solidified, wherein a perfluorocarbon resin having a melt viscosity at 372° C. of 1 to $7 \times 10^5$ poise is used as the resin.

RELATED ART

Patent Documents

Patent Document 1: Japanese Patent Laid-Open No. 58-132512

Patent Document 2: Japanese Patent Publication No. 01-053167

SUMMARY

According to the present disclosure, there is provided an injection molded article comprising a pipe body section forming a flow path of a fluid, and a flange section formed on one end or both ends of the pipe body section, wherein the maximum thickness of the flange section is 2 to 12 mm, the injection molded article contains a copolymer containing tetrafluoroethylene unit and a fluoro(alkyl vinyl ether) unit, the content of the fluoro(alkyl vinyl ether) unit of the copolymer is 2.8 to 6.0% by mass with respect to the whole of the monomer units, the melt flow rate at 372° C. of the copolymer is 4.0 g/10 min or higher and lower than 11.0 g/10 min, and the number of functional groups of the copolymer is 50 or less.

Effects

According the present disclosure, there can be provided an injection molded article comprising a pipe body section, and a flange section having a large thickness, wherein the injection molded article can suppress the abrasion of the inner surface of the pipe body section and the reduction in the sealability of the flange section even in use in a high-temperature environment.

BRIEF DESCRIPTION OF DRAWING

The FIGURE is a schematic cross-sectional view of one embodiment of a lining pipe using the injection molded article of the present disclosure as a lining member for lining an inner surface.

DESCRIPTION OF EMBODIMENTS

Hereinafter, specific embodiments of the present disclosure will be described in detail, but the present disclosure is not limited to the following embodiments.

To prevent the corrosion of a pipe body or valve and the adhesion of a scale, a lining pipe or a lining valve in which fluororesin lining is provided on the inner surface of the pipe body or valve has conventionally been used. As the method for applying fluororesin lining to the pipe body or the valve, an injection molding method and a rotary molding method are known. Among these methods, the injection molding method has advantages in terms that a relatively thick lining can be easily formed, the inner surface of the injection molded article to be obtained is relatively smooth, and the like. When the lining has a flange section, the injection molding method also has advantages in terms that the pipe body section and the flange section can be integrally formed, the flange section having a large thickness and exhibiting a relatively high mechanical strength can be easily formed.

However, in the conventional lining pipe and lining valve lined with a fluororesin by an injection molding method, there are problems in that the inner surface thereof is abraded by passing a fluid at a high temperature containing solid particles therethrough, or the fastened flange section gradually deforms in a high-temperature environment and sufficient sealability cannot be obtained. When the flange section has a large thickness, a large gap is generated as compared with the flange having a small thickness, even if the proportion of change is identical to each other. Thus, the larger the thickness of the flange section is, the more the sealability is reduced. Therefore, there is desired a technique that allows the abrasion of the inner surface of the pipe body section and the reduction in the sealability of the flange section to be suppressed even in use in a high-temperature environment, while ensuring a strength such that the flange section is not easily damaged by application of impact, by making the thickness of the flange section large.

The injection molded article of the present disclosure comprises a pipe body section forming a flow path of a fluid, and a flange section formed on one end or both ends of the pipe body section, and the maximum thickness of the flange section is 2 to 12 mm. Thus, the flange section of the injection molded article of the present disclosure has a sufficient strength and is hardly damaged by impact or the like. Further, the pipe body section and the flange section are formed from a copolymer containing tetrafluoroethylene (TFE) unit and a fluoro(alkyl vinyl ether) (FAVE) unit in which the content of the FAVE unit, the melt flow rate (MFR) and the number of functional groups are in significantly limited ranges. As a result, the abrasion resistance of the pipe body section is improved, and the reduction in the sealability of the flange section which is problematic when the thickness of the flange section is large is also suppressed.

The FIGURE shows one embodiment of a lining pipe using the injection molded article of the present disclosure as a lining member for lining an inner surface. The lining pipe 100 shown in the FIGURE comprises a lining member 1 and a pipe body 2 lined with the lining member 1. The lining member 1 comprises a pipe body section 11 forming a flow path of a fluid and flange sections 12 formed on both ends of the pipe body section 11. Although the flange sections 12 are provided on both ends in the lining member 1, the flange section 12 may be provided on only one end.

The lining member 1 is an injection molded article in which the flange sections 12 are integrally formed with the pipe body section 11. The flange section 12 is usually connected to a flange section provided on another pipe or valve by sandwiching and fastening a packing.

In the injection molded article of the present disclosure, the maximum thickness of the flange section 12 is 2 to 12 mm. Thus, by making the maximum thickness of the flange section 12 large, the injection molded article is hardly damaged even when impact is applied to the flange section 12. When the thickness of the flange section 12 is large, the sealability of the connection part is likely to be reduced. Since the injection molded article of the present disclosure is formed from a copolymer having the content of the FAVE unit, the MFR and the number of functional groups in significantly limited ranges, the sealability is hardly reduced even in continuous use at high temperatures. When the thickness of the flange section is too small, the thickness of the mold is also small, so that it is difficult to fill the mold with the copolymer, and an injection molded article having a flange section in a desired form cannot be obtained. When the thickness of the flange section is too large, a forming defect referred to as a void is likely to be caused during injection molding, and the flange section is likely to be damaged.

Although the thickness of the flange section 12 is uniform in the injection molded article 100 shown in the FIGURE, the thickness may be changed such that the maximum thickness is in the range of 2 to 12 mm. In one embodiment, the whole thickness of the flange section 12 can be in the range of 2 to 12 mm. The maximum thickness of the flange section 12 is preferably 3 mm or more, and preferably 10 mm or less, and more preferably 8 mm or less.

The pipe body section 1 of the injection molded article 100 is cylindrical like the shape of the pipe body 2 to line the inner surface of the pipe body 2. The shape of the pipe body section 1 is not limited to cylindrical, and may be a shape according to the shape of a subject to be lined. The shape of the pipe body section 1 may be, for example, a cylindrical, rectangular cylindrical, or ball-like shape. The pipe body section 1 may be bended or may have a branch.

The thickness of the pipe body section 1 of the injection molded article 100 is not limited, and may be, for example, 0.1 to 100 mm.

The injection molded article of the present disclosure contains a copolymer containing tetrafluoroethylene (TFE) unit and a fluoro(alkyl vinyl ether) (FAVE) unit. The copolymer is a melt-fabricable fluororesin. Being melt-fabricable means that a polymer can be melted and processed by using a conventional processing device such as an extruder or an injection molding machine.

Examples of the FAVE constituting the above FAVE unit include at least one selected from the group consisting of a monomer represented by the general formula (1):

$$CF_2=CFO(CF_2CFY^1O)_p(CF_2CF_2CF_2O)_q\text{--}Rf \qquad (1)$$

wherein $Y^1$ represents F or $CF_3$, and Rf represents a perfluoroalkyl group having 1 to 5 carbon atoms; p represents an integer of 0 to 5; and q represents an integer of 0 to 5, and a monomer represented by the general formula (2):

$$CFX=CXOCF_2OR^1 \qquad (2)$$

wherein X is the same or different and represents H, F or $CF_3$; $R^1$ represents a linear or branched fluoroalkyl group having 1 to 6 carbon atoms which may contain one or two atoms of at least one selected from the group consisting of H, Cl, Br and I, or a cyclic fluoroalkyl group having 5 or 6 carbon atoms which may contain one or two atoms of at least one selected from the group consisting of H, Cl, Br and I.

Among them, the above FAVE is preferably the monomer represented by the general formula (1), more preferably at least one selected from the group consisting of perfluoro (methyl vinyl ether), perfluoro(ethyl vinyl ether) (PEVE) and perfluoro(propyl vinyl ether) (PPVE), still more preferably at least one selected from the group consisting of PEVE and PPVE, and particularly preferably PPVE.

The content of the FAVE unit of the copolymer is 2.8 to 6.0% by mass with respect to the whole of the monomer units. The content of the FAVE unit of the copolymer is more preferably 3.0% by mass or higher, still more preferably 3.2% by mass or higher, further still more preferably 3.3% by mass or higher, especially preferably 3.4% by mass or higher, and most preferably 3.5% by mass or higher, and more preferably 5.8% by mass or lower, still more preferably 5.6% by mass or lower, and further still more preferably 5.5% by mass or lower. When the content of the FAVE unit of the copolymer is too high, the abrasion of the inner surface of the pipe body section caused by the flow of a fluid at a high temperature cannot be sufficiently suppressed. When the content of the FAVE unit of the copolymer is too low, the sealability of the flange section is reduced in use at high temperatures.

The content of the TFE unit of the copolymer is, with respect to the whole of the monomer units, preferably 94.0 to 97.2% by mass, more preferably 94.2% by mass or higher, still more preferably 94.4% by mass or higher, and further still more preferably 94.5% by mass or higher, and more preferably 97.0% by mass or lower, still more preferably 96.8% by mass or lower, further still more preferably 96.7% by mass or lower, especially preferably 96.6% by mass or lower, and most preferably 96.5% by mass or lower. When the content of the TFE unit of the copolymer is too low, the abrasion of the inner surface of the pipe body section caused by the flow of a fluid at a high temperature may not be sufficiently suppressed. When the content of the TFE unit of the copolymer is too high, the sealability of the flange section may be reduced in use at high temperatures.

In the present disclosure, the content of each monomer unit in the copolymer is measured by a $^{19}$F-NMR method.

The copolymer can also contain a monomer unit originated from a monomer copolymerizable with TFE and FAVE. In this case, the content of the monomer unit copolymerizable with TFE and FAVE is, with respect to the whole of the monomer units of the copolymer, preferably 0 to 3.2% by mass, more preferably 0.05 to 1.0% by mass, and still more preferably 0.1 to 0.3% by mass.

The monomers copolymerizable with TFE and FAVE may include hexafluoropropylene (HFP), vinyl monomers represented by $CZ^1Z^2=CZ^3(CF_2)_nZ^4$ wherein $Z^1$, $Z^2$ and $Z^3$ are identical or different, and represent H or F; $Z^4$ represents H, F or Cl; and n represents an integer of 2 to 10, and alkyl perfluorovinyl ether derivatives represented by $CF_2=CF\text{---}$ $OCH_2$—$Rf^1$ wherein $Rf^1$ represents a perfluoroalkyl group having 1 to 5 carbon atoms. Among these, HFP is preferred.

The copolymer is preferably at least one selected from the group consisting of a copolymer consisting only of the TFE unit and the FAVE unit, and TFE/HFP/FAVE copolymer, and is more preferably a copolymer consisting only of the TFE unit and the FAVE unit.

The melt flow rate (MFR) of the copolymer is 4.0 g/10 min or higher and less than 11.0 g/10 min. The MFR of the copolymer is preferably 4.5 g/10 min or higher, and more preferably 5.0 g/10 min or higher, and preferably 10.5 g/10 atoms in the copolymer is calculated according to the following formula (A).

$$N = I \times K / t \tag{A}$$

I: absorbance
K: correction factor
t: thickness of film (mm)

For reference, for some functional groups, the absorption frequency, the molar absorption coefficient and the correction factor are shown in Table 1. Then, the molar absorption coefficients are those determined from FT-IR measurement data of low molecular model compounds.

TABLE 1

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —$COOCH_3$ | 1795 | 680 | 342 | $C_7F_{15}COOCH_3$ |
| —$CONH_2$ | 3436 | 506 | 460 | $C_7H_{15}CONH_2$ |
| —$CH_2OH_2$, —OH | 3648 | 104 | 2236 | $C_7H_{15}CH_2OH$ |
| —$CF_2H$ | 3020 | 8.8 | 26485 | $H(CF_2CF_2)_3CH_2OH$ |
| —CF=$CF_2$ | 1795 | 635 | 366 | $CF_2$=$CF_2$ | or lower, more preferably 10.0 g/10 or lower, still more preferably 9.5 g/10 or lower, and especially preferably 9.0 g/10 min or lower. When the MFR is too low, an injection molded article having a flange section having a desired thickness cannot be obtained. When the MFR of the copolymer is too high, the abrasion of the inner surface of the pipe body section caused by the flow of a fluid at a high temperature cannot be sufficiently suppressed, and the sealability of the flange section is reduced in use at high temperatures.

In the present disclosure, the MFR is a value obtained as a mass (g/10 min) of the polymer flowing out from a nozzle of 2.1 mm in inner diameter and 8 mm in length per 10 min at 372° C. under a load of 5 kg using a melt indexer, according to ASTM D1238.

The MFR can be regulated by regulating the kind and amount of a polymerization initiator to be used in polymerization of monomers, the kind and amount of a chain transfer agent, and the like.

In the present disclosure, the number of functional groups per $10^6$ main-chain carbon atoms of the copolymer is 50 or less, preferably 40 or less, more preferably 30 or less, still more preferably 20 or less, further still more preferably 15 or less, especially preferably 10 or less, and most preferably less than 6. When the number of functional groups of the copolymer is too high, the sealability of the flange section is reduced in use at high temperatures.

For identification of the kind of the functional groups and measurement of the number of the functional groups, infrared spectroscopy can be used.

The number of the functional groups is measured, specifically, by the following method. First, the copolymer is formed by cold press to prepare a film of 0.25 to 0.30 mm in thickness. The film is analyzed by Fourier transform infrared spectroscopy to obtain an infrared absorption spectrum of the copolymer, and a difference spectrum against a base spectrum that is completely fluorinated and has no functional groups is obtained. From an absorption peak of a specific functional group observed on this difference spectrum, the number N of the functional group per $1 \times 10^6$ carbon Absorption frequencies of —$CH_2CF_2H$, —$CH_2COF$, —$CH_2COOH$, —$CH_2COOCH_3$ and —$CH_2CONH_2$ are lower by a few tens of kaysers ($cm^{-1}$) than those of —$CF_2H$, —COF, —COOH free and —COOH bonded, —$COOCH_3$ and —$CONH_2$ shown in the Table, respectively.

For example, the number of the functional group —COF is the sum of the number of a functional group determined from an absorption peak having an absorption frequency of 1,883 $cm^{-1}$ derived from —$CF_2COF$ and the number of a functional group determined from an absorption peak having an absorption frequency of 1,840 $cm^{-1}$ derived from —$CH_2COF$.

The functional groups are ones present on main chain terminals or side chain terminals of the copolymer, and ones present in the main chain or the side chains. The number of the functional groups may be the sum of numbers of —CF=$CF_2$, —$CF_2H$, —COF, —COOH, —$COOCH_3$, —$CONH_2$ and —$CH_2OH$.

The functional groups are introduced to the copolymer by, for example, a chain transfer agent or a polymerization initiator used for production of the copolymer. For example, in the case of using an alcohol as the chain transfer agent, or a peroxide having a structure of —$CH_2OH$ as the polymerization initiator, —$CH_2OH$ is introduced on the main chain terminals of the copolymer. Alternatively, the functional group is introduced on the side chain terminal of the copolymer by polymerizing a monomer having the functional group.

The copolymer satisfying the above range regarding the number of functional groups can be obtained by subjecting the copolymer to a fluorination treatment. That is, the copolymer contained in the injection molded article of the present disclosure is preferably one which is subjected to the fluorination treatment. Further, the copolymer contained in the injection molded article of the present disclosure preferably has —$CF_3$ terminal groups.

The melting point of the copolymer is preferably 295 to 315° C., more preferably 300° C. or higher, still more preferably 301° C. or higher, and especially preferably 302° C. or higher, and more preferably 310° C. or lower, and still more preferably 305° C. or lower. When the melting point is within the above range, the abrasion of the inner surface of the pipe body section and the reduction in the sealability of the flange section can be further suppressed.

In the present disclosure, the melting point can be measured by using a differential scanning calorimeter [DSC].

In the injection molded article of the present disclosure, the storage elastic modulus (E') at 150° C. is preferably 67 MPa or higher, and more preferably 70 MPa or higher. Due to that the storage elastic modulus (E') at 150° C. of the injection molded article is within the above range, the elastic modulus of the injection molded article at high temperatures is further increased, and the injection molded article is further excellent in the high elasticity at high temperatures. Thus, the sealability of the flange section is further improved, and the reduction in the sealability is further suppressed.

The storage elastic modulus (E') can be measured by carrying out a dynamic viscoelasticity measurement under the condition of a temperature-increasing rate of 2° C./min and a frequency of 10 Hz and in the range of 30 to 250° C.

The injection molded article of the present disclosure can be produced by injection molding the above copolymer. More specifically, the injection molded article of the present disclosure can be produced by a production method for obtaining an injection molded article by injection molding a copolymer using an injection molding machine provided with a cylinder, and a screw accommodated in the cylinder. The shape of the copolymer to be supplied into an injection molding machine is not limited, and a copolymer in a shape of powder, pellet, or the like can be used.

In addition, there can be produced an injection molded article in a state of being lined on the inner surface of a pipe body or a valve by installing a core material in the hollow of the pipe body or valve, injecting a copolymer in a melt state from an injection molding machine into a space between the inner surface of the pipe body or valve and the core material, cooling the copolymer to solidify, and then extracting the core material.

The injection molded article of the present disclosure can be preferably used as a lining member of a lining pipe or lining valve.

By lining the inner surface of a pipe body with the injection molded article of the present disclosure, a lining pipe can be prepared. The lining pipe comprises a lining member formed from the injection molded article of the present disclosure, and a pipe body lined with the lining member. By forming the surface of the lining pipe to be in contact with a fluid by using the lining member, the corrosion of the pipe body can be suppressed even when the pipe body is formed from a metal, and further, the adhesion of a scale to the inner surface of the lining pipe can be suppressed. The lining pipe can be suitably utilized as a piping for allowing a chemical solution to flow.

By lining the inner surface of a valve body with the injection molded article of the present disclosure, a lining valve can be prepared. The lining valve comprises a lining member formed from the injection molded article of the present disclosure, and a valve body lined with the lining member. By forming the surface of the lining valve to be in contact with a fluid by using the lining member, the corrosion of the valve body can be suppressed even when the valve body is formed from a metal, and further, the adhesion of a scale to the inner surface of the lining valve can be suppressed. The lining valve can be suitably utilized as a valve for allowing a chemical solution to flow.

Although the embodiments have been described above, it will be understood that various changes in form and details are possible without departing from the gist and scope of the claims.

According to the present disclosure, there is provided an injection molded article comprising a pipe body section forming a flow path of a fluid, and a flange section formed on one end or both ends of the pipe body section, wherein the maximum thickness of the flange section is 2 to 12 mm, the injection molded article contains a copolymer containing tetrafluoroethylene unit and a fluoro(alkyl vinyl ether) unit, the content of the fluoro(alkyl vinyl ether) unit of the copolymer is 2.8 to 6.0% by mass with respect to the whole of the monomer units, the melt flow rate at 372° C. of the copolymer is 4.0 g/10 min or higher and lower than 11.0 g/10 min, and the number of functional groups of the copolymer is 50 or less.

The fluoro(alkyl vinyl ether) unit of the copolymer is preferably perfluoro(propyl vinyl ether) unit.

The content of the fluoro(alkyl vinyl ether) unit of the copolymer is preferably 3.5 to 5.5% by mass with respect to the whole of the monomer units.

The melt flow rate at 372° C. of the copolymer is preferably 5.0 to 9.0 g/10 min.

The melting point of the copolymer is preferably 295 to 315° C.

The injection molded article is preferably a lining member of a lining pipe or a lining valve.

According to the present disclosure, a lining pipe in which the surface thereof to be in contact with a fluid is lined with the above injection molded article.

According to the present disclosure, there is provided a lining valve in which the surface thereof to be in contact with a fluid is lined with the above injection molded article.

EXAMPLES

Next, embodiments of the present disclosure will be described with reference to examples, but the present disclosure is not intended to be limited by these examples.

The numerical values of the Examples were measured by the following methods.

(Content of Monomer Unit)

The content of each monomer unit was measured by an NMR analyzer (for example, manufactured by Bruker BioSpin GmbH, AVANCE 300, high-temperature probe).

(Melt Flow Rate (MFR))

The polymer was made to flow out from a nozzle of 2.1 mm in inner diameter and 8 mm in length at 372° C. under a load of 5 kg by using a Melt Indexer G–01 (manufactured by Toyo Seiki Seisaku-sho, Ltd.) according to ASTM D1238, and the mass (g/10 min) of the polymer flowing out per 10 min was determined.

(Melting Point)

The polymer was heated, as a first temperature raising step at a temperature-increasing rate of 10° C./min from 200° C. to 350° C., then cooled at a cooling rate of 10° C./min from 350° C. to 200° C., and then again heated, as second temperature raising step, at a temperature-increasing rate of 10° C./min from 200° C. to 350° C. by using a differential scanning calorimeter (trade name: X-DSC7000, manufactured by Hitachi High-Tech Science Corp.); and the melting point was determined from a melting curve peak observed in the second temperature raising step.

(Number of Functional Groups)

Pellets of the copolymer was formed by cold press into a film of 0.25 to 0.30 mm in thickness. The film was 40 times scanned and analyzed by a Fourier transform infrared spectrometer [FT-IR (Spectrum One, manufactured by PerkinElmer, Inc.)] to obtain an infrared absorption spectrum, and a difference spectrum against a base spectrum that is completely fluorinated and has no functional groups is obtained. From an absorption peak of a specific functional group observed on this difference spectrum, the number N of the functional group per $1 \times 10^6$ carbon atoms in the sample was calculated according to the following formula (A).

$$N = I \times K / t \qquad (A)$$

I: absorbance
    K: correction factor
    t: thickness of film (mm)

Regarding the functional groups in the present disclosure, for reference, the absorption frequency, the molar absorption coefficient and the correction factor are shown in Table 2. The molar absorption coefficients are those determined from FT-IR measurement data of low molecular model compounds.

TABLE 2

| Functional Group | Absorption Frequency $(cm^{-1})$ | Molar Extinction Coefficient $(l/cm/mol)$ | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2=CF_2$ |

Synthesis Example 1

51.8 L of pure water was charged in a 174 L-volume autoclave; nitrogen replacement was sufficiently carried out; thereafter, 40.9 kg of perfluorocyclobutane, 0.54 kg of perfluoro(propyl vinyl ether) (PPVE) and 5.10 kg of methanol were charged; and the temperature in the system was held at 35° C. and the stirring speed was held at 200 rpm. Then, tetrafluoroethylene (TFE) was introduced under pressure up to 0.64 MPa, and thereafter 0.051 kg of a 50% methanol solution of di-n-propyl peroxydicarbonate was charged to initiate polymerization. Since the pressure in the system decreased along with the progress of the polymerization, TFE was continuously supplied to make the pressure constant, and 0.020 kg of PPVE was additionally charged for every 1 kg of TFE supplied. The polymerization was finished at the time when the amount of TFE additionally charged reached 40.9 kg. Unreacted TFE was released to return the pressure in the autoclave to the atmospheric pressure, and thereafter, an obtained reaction product was washed with water and dried to thereby obtain 41.1 kg of a powder.

The obtained powder was melt extruded at 360° C. by a screw extruder (trade name: PCM46, manufactured by Ikegai Corp.) to thereby obtain pellets of a TFE/PPVE copolymer. By using the obtained pellets, the PPVE content was measured by the above-mentioned method.

The obtained pellets were put in a vacuum vibration-type reactor VVD-30 (manufactured by Okawara MFG. Co., Ltd.), and heated to 210° C. After vacuumizing, F$_2$ gas diluted to 20% by volume with N$_2$ gas was introduced to the atmospheric pressure. 0.5 hour after the F$_2$ gas introduction, vacuumizing was once carried out and the F$_2$ gas was again introduced. Further, 0.5 hour thereafter, vacuumizing was again carried out and F$_2$ gas was again introduced. Thereafter, while the above operation of the F$_2$ gas introduction and the vacuumizing was carried out once every 1 hour, the reaction was carried out at a temperature of 210° C. for 10 hours. After the reaction was finished, the reactor interior was replaced sufficiently by N$_2$ gas to finish the fluorination reaction. By using the fluorinated pellets, the above physical properties were measured by the methods described above.

Synthetic Example 2

Fluorinated pellets were obtained as in Synthesis Example 1, except for changing the charged amount of PPVE to 3.47 kg, changing the charged amount of methanol to 3.28 kg, changing the charged amount of the 50% methanol solution of di-n-propyl peroxydicarbonate to 0.026 kg, and adding 0.071 kg of PPVE for every 1 kg of TFE supplied, to thereby obtain 43.8 kg of a dry powder.

Synthesis Example 3

Fluorinated pellets were obtained as in Synthesis Example 1, except for changing the charged amount of PPVE to 2.69 kg, changing the charged amount of methanol to 0.10 kg, changing the charged amount of the 50% methanol solution of di-n-propyl peroxydicarbonate to 0.026 kg, and adding 0.057 kg of PPVE for every 1 kg of TFE supplied, to thereby obtain 43.2 kg of a dry powder.

Synthesis Example 4

Fluorinated pellets were obtained as in Synthesis Example 1, except for changing the charged amount of PPVE to 2.69 kg, changing the charged amount of methanol to 2.48 kg, and adding 0.057 kg of PPVE for every 1 kg of TFE supplied, to thereby obtain 43.2 kg of a dry powder.

Synthesis Example 5

Non-fluorinated pellets were obtained as in Synthesis Example 1, except for changing the charged amount of PPVE to 2.75 kg, changing the charged amount of methanol to 0.88 kg, and adding 0.058 kg of PPVE for every 1 kg of TFE supplied, to thereby obtain 43.3 kg of a dry powder.

Synthesis Example 6

Fluorinated pellets were obtained as in Synthesis Example 1, except for changing the charged amount of PPVE to 1.49 kg, changing the charged amount of methanol to 1.65 kg, and adding 0.036 kg of PPVE for every 1 kg of TFE supplied, to thereby obtain 42.4 kg of a dry powder.

Synthesis Example 7

Fluorinated pellets were obtained as in Synthesis Example 1, except for changing the charged amount of PPVE to 2.11 kg, changing the charged amount of methanol to 1.28 kg, adding 0.047 kg of PPVE for every 1 kg of TFE supplied, changing the raised temperature of the vacuum vibration-type reactor to 170° C., and changing the reaction condition to at 170° C. and for 5 hours, to thereby obtain 42.8 kg of a dry powder.

Synthesis Example 8

Fluorinated pellets were obtained as in Synthesis Example 1, except for changing the charged amount of PPVE to 2.75 kg, changing the charged amount of methanol to 0.60 kg, and adding 0.058 kg of PPVE for every 1 kg of TFE supplied, to thereby obtain 43.3 kg of a dry powder.

The results are shown in Table 3.

TABLE 3

|  | PPVE content (% by mass) | MFR (g/10 min) | Melting point (° C.) | Number of functional groups (number/C10⁶) |
|---|---|---|---|---|
| Synthesis Example 1 | 2.0 | 8.0 | 314 | <6 |
| Synthesis Example 2 | 6.6 | 9.0 | 298 | <6 |
| Synthesis Example 3 | 5.4 | 2.3 | 301 | <6 |
| Synthesis Example 4 | 5.4 | 15.0 | 302 | <6 |
| Synthesis Example 5 | 5.5 | 8.8 | 302 | 193 |
| Synthesis Example 6 | 3.5 | 5.0 | 307 | <6 |
| Synthesis Example 7 | 4.5 | 7.0 | 303 | 28 |
| Synthesis Example 8 | 5.5 | 9.0 | 302 | <6 |

The description of "<6" in Table 3 means that the number of functional groups is less than 6.

Examples 1 to 8

By using the pellets obtained as above, the injection molded article was prepared by the following method. The results are shown in Table 4.

Preparation of Injection Molded Article (1) (Comparative)

The pellets were injection molded by using an injection molding machine (SE50EV-A, manufactured by Sumitomo Heavy Industries, Ltd.) and setting the cylinder temperature to 395° C., the mold temperature to 220° C., the injection speed to 3 mm/s, and the holding pressure to 50 MPa, to thereby prepare an injection molded article (10 cm×10 cm×0.10 cmt). It was tried to prepare an injection molded article (1) by cutting the obtained sheet-shape injection molded article, but the mold was not sufficiently filled with the molten copolymer, so that the formed article was not successfully obtained.

Preparation of Injection Molded Article (2)

The pellets were injection molded by using an injection molding machine (SE50EV-A, manufactured by Sumitomo Heavy Industries, Ltd.) and setting the cylinder temperature to 395° C., the mold temperature to 220° C., the injection speed to 3 mm/s, and the holding pressure to 50 MPa, to thereby prepare an injection molded article (10 cm×10 cm×0.30 cmt). By cutting the obtained sheet-shape injection molded article, an injection molded article (2) was prepared.

Preparation of Injection Molded Article (3)

The pellets were injection molded by using an injection molding machine (SE50EV-A, manufactured by Sumitomo Heavy Industries, Ltd.) and setting the cylinder temperature to 395° C., the mold temperature to 220° C., the injection speed to 3 mm/s, and the holding pressure to 50 MPa, to thereby prepare an injection molded article (5 cm×5 cm×0.7 cmt). By cutting the obtained sheet-shape injection molded article, an injection molded article (3) was prepared.

Preparation of Injection Molded Article (4)

The pellets were injection molded by using an injection molding machine (SE50EV-A, manufactured by Sumitomo Heavy Industries, Ltd.) and setting the cylinder temperature to 395° C., the mold temperature to 220° C., the injection speed to 3 mm/s, and the holding pressure to 50 MPa, to thereby prepare an injection molded article (5 cm×5 cm×1.0 cmt). By cutting the obtained sheet-shape injection molded article, an injection molded article (4) was prepared.

Preparation of Injection Molded Article (5) (Comparative)

The pellets were injection molded by using an injection molding machine (SE50EV-A, manufactured by Sumitomo Heavy Industries, Ltd.) and setting the cylinder temperature to 395° C., the mold temperature to 220° C., the injection speed to 3 mm/s, and the holding pressure to 50 MPa, to thereby prepare an injection molded article (5 cm×5 cm×1.5 cmt). By cutting the obtained sheet-shape injection molded article, an injection molded article (5) was prepared.

Regarding the injection molded articles (2) to (5), the appearance was evaluated according to the following criteria. The results are shown in Table 5. In Table 5, "unformable" represents that the mold was not sufficiently filled with the molten copolymer and the formed article was not successfully obtained.

(Evaluation of Moldability (Void))

Ten injection molded articles were visually observed and evaluated according to the following criteria.

N: there was no voids in all the formed articles

Y: a void was observed in one or more formed articles (Evaluation of Moldability (Burr))

The injection molded articles were visually observed and evaluated according to the following criteria.

N: no burr

Y: a burr was observed

TABLE 4

| Type of copolymer | Preparation of injection molded article (1) (comparative) | | Preparation of injection molded article (2) | | Preparation of injection molded article (3) | | Preparation of injection molded article (4) | | Preparation of injection molded article (5) (comparative) | |
|---|---|---|---|---|---|---|---|---|---|---|
| | Void | Burr | Void | Burr | Void | Burr | Void | Burr | Void | Burr |
| Example 1 Synthesis Example 1 | Unformable | | N | N | N | N | N | N | Y | N |
| Example 2 Synthetic Example 2 | Unformable | | N | N | N | N | N | N | Y | N |
| Example 3 Synthesis Example 3 | Unformable | | Unformable | | Unformable | | Unformable | | Unformable | |
| Example 4 Synthesis Example 4 | Unformable | | N | Y | N | Y | N | Y | Y | Y |
| Example 5 Synthesis Example 5 | Unformable | | N | N | N | N | N | N | Y | N |
| Example 6 Synthesis Example 6 | Unformable | | N | N | N | N | N | N | Y | N |
| Example 7 Synthesis Example 7 | Unformable | | N | N | N | N | N | N | Y | N |
| Example 8 Synthesis Example 8 | Unformable | | N | N | N | N | N | N | Y | N |

Examples 9 to 13 (Comparative) and Examples 14 to 16

The injection molded articles obtained above were evaluated according to the following methods. The results are shown in Table 5.

(Abrasion Test)

The injection molded article (2) obtained above was used as a test piece, the prepared test piece was fixed on a test bench of a Taber abrasion tester (No. 101 Taber type abrasion tester with an option, manufactured by YASUDA SEIKI SEISAKUSHO, LTD.), and the abrasion test was carried out at a test piece surface temperature of 90° C. and a load of 500 g, using an abrasion wheel CS-10 (rotationally polished in 20 rotations with an abrasive paper #240) and at a rotation rate of 60 rpm by using the Taber abrasion tester. The weight of the test piece after 1,000 rotations was measured, and the same test piece was further subjected to the test of 5,000 rotations and thereafter, the weight thereof was measured. The abrasion loss was determined by the following formula.

$$\text{Abrasion loss (mg)} = M1 - M2$$

M1: the weight of the test piece after the 1,000 rotations (mg)

M2: the weight of the test piece after the 5,000 rotations (mg)

(Evaluation of Creep Resistance)

The measurement of the creep resistance was carried out according to a method described in ASTM D395 or JIS K6262:2013. The injection molded article (3) obtained above was cut to prepare a test piece of 13 mm in outer diameter and 6 mm in height. The prepared test piece was compressed by using a compression device at ambient temperature to a compression deformation rate of 25%. The compressed test piece fixed on the compression device was allowed to stand still in an electric furnace at 80° C. for 72 hours. The compression device was taken out from the electric furnace, and cooled to room temperature; thereafter, the test piece was dismounted. The collected test piece was allowed to stand at room temperature for 30 min, and the height of the collected test piece was measured and the proportion of recovery was determined by the following formula. A formed article whose shape sufficiently recovers after compression at 80° C. is excellent in the creep resistance, and the sealability is hardly reduced in use at high temperatures.

$$\text{Proportion of recovery (\%)} = (t_2 - t_1)/t_3 \times 100$$

$t_1$: the height of a spacer (mm)

$t_2$: the height of the test piece dismounted from the compression device (mm)

$t_3$: the height (mm) after being compressively deformed In the above test, $t_1$ was 4.5 mm and $t_3$ was 1.5 mm.

(Storage Elastic Modulus (E'))

The storage elastic modulus was determined by carrying out a dynamic viscoelasticity measurement using a DVA-220 (manufactured by IT Keisoku Seigyo K.K.). The injection molded article (3) obtained above was cut to prepare a test piece of 25 mm in length, 2 mm in width, and 1 mm in thickness. The measurement was carried out under the condition of a temperature-increasing rate of 2° C./min, and a frequency of 10 Hz, and in the range of 30° C. to 250° C. by using the prepared test piece, and the storage elastic modulus (MPa) at 150° C. was identified. A formed article having a large storage elastic modulus at 150° C. can exhibits moderate hardness at high temperatures, and the sealability is hardly reduced in use at high temperatures.

(Amount of Recovery)

The measurement of the amount of recovery was carried out according to a method described in ASTM D395 or JIS K6262:2013.

The injection molded article (3) obtained above was cut to prepare a test piece of 13 mm in outer diameter and 6 mm in height. The prepared test piece was compressed to a compression deformation rate of 50% (that is, the test piece of 6 mm in height was compressed to a height of 3 mm) at a normal temperature by using a compression device. The compressed test piece fixed on the compression device was allowed to stand still in an electric furnace at 150° C. for 18 hours. The compression device was taken out from the electric furnace, and cooled to room temperature; thereafter, the test piece was dismounted. The collected test piece was allowed to stand at room temperature for 30 min, and the height of the collected test piece was measured and the amount of recovery was determined by the following formula.

$$\text{Amount of recovery (mm)} = t_2 - t_1$$

$t_1$: the height of a spacer (mm)

$t_2$: the height of the test piece dismounted from the compression device (mm)

In the above test, $t_1$ was 3 mm.

(Repulsive Force at 150° C.)

The repulsive force at 150° C. was determined from the result of the compression set test at 150° C. and the result of the storage elastic modulus measurement at 150° C. by the following formula.

$$\text{Repulsive force at } 150°\text{ C. (MPa): } (t_2 - t_1)/t_1 \times E'$$

$t_1$: the height of a spacer (mm)

$t_2$: the height of the test piece dismounted from the compression device (mm)

$E'$: a storage elastic modulus (MPa) at 150° C.

A formed article having a large repulsive force at 150° C. has a high sealability at high temperatures, and the sealability is hardly reduced even in continuous use at high temperatures.

TABLE 5

| | Type of copolymer | Abrasion loss at 90° C. (mg) | Evaluation of creep resistance Proportion of recovery (%) | Storage elastic modulus at 150° C. (MPa) | Amount of recovery (mm) | Repulsive force at 150° C. (MPa) |
|---|---|---|---|---|---|---|
| Example 9 (comparative) | Synthesis Example 1 | 28.3 | 38% | 156 | 0.044 | 2.29 |
| Example 10 (comparative) | Synthetic Example 2 | 21.2 | 17% | 63 | 0.013 | 0.27 |
| Example 11 (comparative) | Synthesis Example 3 | — | — | — | — | — |
| Example 12 (comparative) | Synthesis Example 4 | 30.5 | 20% | 79 | 0.015 | 0.40 |
| Example 13 (comparative) | Synthesis Example 5 | 23.1 | 17% | 69 | 0.017 | 0.39 |
| Example 14 | Synthesis Example 6 | 20.7 | 33% | 109 | 0.035 | 1.27 |
| Example 15 | Synthesis Example 7 | 22.5 | 27% | 86 | 0.026 | 0.75 |
| Example 16 | Synthesis Example 8 | 23.4 | 21% | 70 | 0.019 | 0.44 |

It is found from the results shown in Table 4 that a flange section having no forming defects can be formed by carrying out injection molding using a copolymer in which the thickness of the flange section (that is, the thickness of the cavity of the mold) is adjusted to a suitable range, and the content of the FAVE unit, the MFR and the number of functional groups are in significantly limited ranges. In contrast, it is found that, when the thickness of the flange section is too small, the thickness of the cavity of the mold used in injection molding is also small, so that it is difficult to fill the mold with the copolymer, and an injection molded article having a flange section in a desired form cannot be obtained. It is found that, when the thickness of the flange section is too large, the thickness of the cavity of the mold used in injection molding is also large, so that a forming defect referred to as a void is caused. The void is not preferable since it reduces the mechanical strength of the flange section.

It is found from the results shown in Table 5 that the injection molded article formed from a copolymer in which the content of the FAVE unit, the MFR and the number of functional groups are in significantly limited ranges has a low abrasion loss at 90° C., excellent creep resistance, a high storage elastic modulus, and high repulsive force at 150° C. Thus, the injection molded article of the present disclosure formed from a copolymer in which the content of the FAVE unit, the MFR and the number of functional groups are in significantly limited ranges can sufficiently suppress the abrasion of the inner surface of the pipe body section caused by the flow of a fluid at a high temperature. Further, by fastening the flange section, the connection part is sufficiently sealed despite of a large thickness of the flange section when the injection molded article of the present disclosure is connected with other members, and excellent sealability is hardly impaired even in continuous use at high temperatures.

The invention claimed is:

1. An injection molded article comprising a pipe body section forming a flow path of a fluid, and a flange section formed on one end or both ends of the pipe body section, wherein the maximum thickness of the flange section is 2 to 12 mm, the injection molded article comprises a copolymer comprising tetrafluoroethylene unit and a fluoro(alkyl vinyl ether) unit, a content of the fluoro(alkyl vinyl ether) unit of the copolymer is 2.8 to 6.0% by mass with respect to the whole of the monomer units, a melt flow rate at 372° C. of the copolymer is 4.0 g/10 min or higher and lower than 11.0 g/10 min, and the total number of —CF=CF$_2$, —CF$_2$H, —COF, —COOH, —COOCH$_3$, —CONH$_2$ and —CH$_2$OH of the copolymer is 50 or less per $10^6$ main-chain carbon atoms.

2. The injection molded article according to claim 1, wherein the fluoro(alkyl vinyl ether) unit of the copolymer is perfluoro(propyl vinyl ether) unit.

3. The injection molded article according to claim 1, wherein the content of the fluoro(alkyl vinyl ether) unit of the copolymer is 3.5 to 5.5% by mass with respect to the whole of the monomer units.

4. The injection molded article according to claim 1, wherein the melt flow rate at 372° C. of the copolymer is 5.0 to 9.0 g/10 min.

5. The injection molded article according to claim 1, wherein the melting point of the copolymer is 295 to 315° C.

6. The injection molded article according to claim 1, wherein the injection molded article is a lining member of a lining pipe or a lining valve.

7. A lining pipe wherein a surface thereof to be in contact with a fluid is lined with the injection molded article according to claim 1.

8. A lining valve wherein a surface thereof to be in contact with a fluid is lined with the injection molded article according to claim 1.

\* \* \* \* \*